United States Patent [19]

Gustafsson

[11] Patent Number: 4,773,514
[45] Date of Patent: Sep. 27, 1988

[54] HYDRAULIC DAMPING DEVICE

[75] Inventor: Leif Gustafsson, Holmsjö, Sweden

[73] Assignee: Per Hakan Albertsson, Emmaboda, Sweden

[21] Appl. No.: 893,299

[22] PCT Filed: Nov. 28, 1985

[86] PCT No.: PCT/SE85/00495
§ 371 Date: Jul. 28, 1986
§ 102(e) Date: Jul. 28, 1986

[87] PCT Pub. No.: WO86/03267
PCT Pub. Date: Jun. 5, 1986

[30] Foreign Application Priority Data

Nov. 28, 1984 [SE] Sweden ................ 8406018

[51] Int. Cl.⁴ .................. B62K 21/08; F16F 9/14
[52] U.S. Cl. ...................... 188/306; 188/310; 280/90; 280/272
[58] Field of Search ........... 188/306, 308, 309, 310; 280/90, 272

[56] References Cited

U.S. PATENT DOCUMENTS

| | | | |
|---|---|---|---|
| 1,506,495 | 8/1924 | MacRae | 188/310 X |
| 1,628,811 | 5/1927 | Shultz et al. | 188/308 X |
| 1,957,997 | 5/1934 | Fieldman | 188/310 |
| 2,009,678 | 7/1935 | Pennington | 188/306 X |
| 2,039,695 | 5/1936 | Watt | 188/306 X |
| 2,084,001 | 6/1937 | McGinnes | 188/306 |
| 2,087,535 | 7/1937 | Dall | 74/495 X |
| 3,512,803 | 5/1970 | Hines et al. | 188/310 |

FOREIGN PATENT DOCUMENTS

| | | | |
|---|---|---|---|
| 537411 | 5/1922 | France | 188/310 |
| 2710651 | 9/1978 | Fed. Rep. of Germany | 280/272 |

Primary Examiner—Kenneth J. Dorner
Assistant Examiner—Peter R. Brown
Attorney, Agent, or Firm—Edwin S. Teltscher

[57] ABSTRACT

A hydraulic device for damping a relative pivotal movement of a motor cycle wheel, which is rotatably journalled at the free end portion of a fork, said fork being pivotably mounted at the frame of the motor cycle. The damping device is of the kind comprising a casing (6) having a sector-shaped hydraulic chamber (11), in which a piston wing (23) is pivotable while being damped by hydraulic fluid. The device is adapted to be mounted adjacent to the fork mounting of the frame of the motor cycle with the casing (6) secured to the fork or to the frame and with a shaft (8), which is connected to the piston wing (23), secured to the frame or the fork, respectively, in coaxial alignment with the pivot axis of the fork.

17 Claims, 3 Drawing Sheets

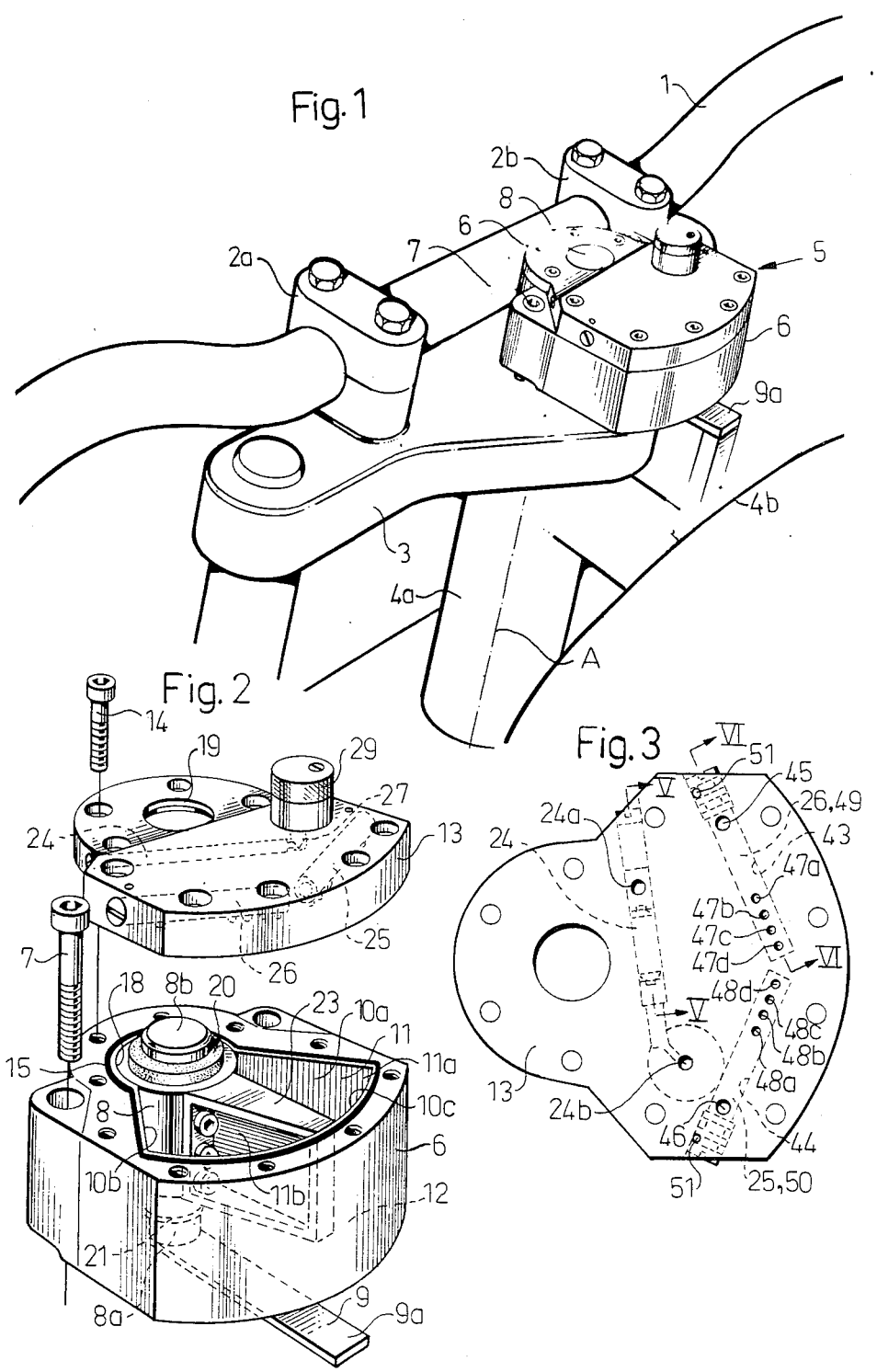

HYDRAULIC DAMPING DEVICE

The invention relates to a hydraulic damping device of the kind indicated in the preamble of claim 1. Thus, it is intended to be used in motor cycles in order to achieve a controlled damping of rapid pivotal or oscillating movements of the front or back wheel while driving.

One important aspect of the invention is to solve the problem of so called wobbling, which has been observed more and more during recent years, wherein at high speed, the front wheel of the motor cycle sometimes starts to oscillate with an increasing amplitude. The driver has great difficulties in stopping such a phenomenon and many severe accidents have occured as a direct consequence thereof. It is also desireable to dampen sudden jerks caused by irregularites on the road-way or the ground.

Another aspect of the invention is to achieve a controlled shock absorption of the back wheel when the latter hits the ground upon jumping of the whole motor cycle, especially in motor-cross driving. Conventionally, such shock absorbtion is effected solely by spring means operatively connected between the frame and the back wheel fork, which is pivotably mounted at the frame of the motor cycle.

It is generally known that oscillations or other movements of mechanical systems can be damped by means of hydraulic shock absorbers, especially of the kind comprising a cylinder and a piston displaceable therein. However, there is also another type of hydraulic dampers, comprising a casing having a sector-shaped hydraulic chamber in which a piston wing is pivotable back and forth while being damped by hydraulic fluid, which is previously known from the patent specifications GB No. 1148 384 (Armstrong), U.S. Pat. No. 1,873,100 (Allen) and U.S. Pat No. 1,957,996 (Fieldman), all these known devices being adapted to be mounted in automative vehicles having at least four wheels.

Thus, GB No. 1 148 384 (Armstrong) discloses a hydraulic damper forming a part of a steering assembly controlling the two front road wheels of a vehicle. By way of links coupled to the front wheels, the damper, taking the place of the usual steering idler box, will damp high frequency vibrations occurring in straight ahead driving or when rounding slight curves at critical speeds. For this purpose, the complementary compartments on each side of the pivotable piston wing or vane are connected by fluid flow resting means, including damping valves, incorporated in the shaft or spindle connected to the wing. The damping effect is progressively reduced at each side of a central angular region by means of hydraulic bypass grooves in the top plate of the casing.

U.S. Pat. No. 1,873,100 (Allen) relates to a hydraulic shock absorbing device for minimizing the road shocks normally transmitted through the springs of the frame of a motor-driven vehicle. A semi-circular casing is attached to the frame of the vehicle, whereas the internal piston wing or vane is connected to a shaft, the end of which is connected to a wheel axis of the vehicle by way of a lever and a rigid connecting link. A bypass channel in the casing is provided with an adjustment screw, whereby the damping power can be set as desired.

U.S. Pat. No. 1,957,996 (Friedman) discloses a hydraulic shock absorber adapted to be mounted in a similar manner as the Allen device. However, this device is rather complicated and includes a reservoir chamber communicating via check valves with each working chamber on the respective sides of the piston wing, a separate valve casing including a plurality of channels and valve means, and plates provided with bypass grooves and apertures, so as to provide compensation for fluid leakage from the working chambers, variations in temperature and viscosity of the fluid, and a controlled damping of the compression movement of the vehicle spring as well as the rebound movement. In the bypass passages between the chamber compartments on each side of the piston wing, there are independent check valves each consisting of a ball held in port-closing position by means of a spring. Each valve will open when the pressure in the corresponding chamber is sufficiently great to open the valve against the force of the spring. Moreover, there is a central bypass passage with a large flow capacity, so that practically no damping power is obtained for small piston wing movements adjacent a normal central position.

For various reasons, none of these known devices is suitable for motor cycles. In the first place, the link connections between the moving parts and the nature of the bypass valves will make it difficult to effectively damp small oscillatory movements such as those occurring during "wobbling". Furthermore, none of the devices is adapted to enable relatively slow turning movements of the front wheel and effectively damp rapid pivotal movements (which are not initiated by the driver).

Another problem related to the known devices is that the pivotably journalled piston wing will be exposed to a great axial force upon a heavy pressure built-up in the hydraulic chambers, such an axial force resulting from different effective areas on the axial sides exposed to the hydraulic pressure and causing a jamming effect, which makes further pivoting of the piston wing impossible.

Still another problem is to avoid extensive wear of the device, particularly with regard to the bearing of the rotable shaft which carries the piston wing.

The object of the invention is to solve these problems and to provide a relatively simple hydraulic damping device suitable for motor cycles.

This object is achieved for a device having the features stated in claim 1. Further advantageous features are stated in the sub-claims and will appear from the detailed description below.

The invention will thus be described further below, reference being made to the appended drawings showing some preferred embodiments.

FIG. 1 shows in a perspective view a damping device according to the invention mounted at a motor cycle at the pivotal bearing of the front wheel fork;

FIG. 2 shows, likewise in a perspective view and in a larger scale, the damping device itself, the casing of which is shown with disassembled cover; and FIG. 3 shows the cover from beneath.

Figure 4:
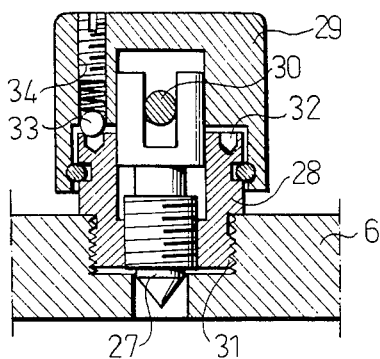
FIG. 4 shows a rotatable adjustment knob in longitudinal section, whereby a choking screw can be positioned at wish.

In FIG. 1, a portion of the steering bar 1 of a motor cycle (not shown) is shown schematically. the steering bar 1 is fastened to a front fork top member 3 by means of clamping fasteners 2a, 2b, the lower end of said front fork top member 3 being connected to the front fork (not shown), at the free end of which the front wheel is rotably journalled. The front fork top member 3 is pivotably mounted at a front portion 4a of the motor cycle frame, so that the front wheel may be turned at wish by means of the steering bar 1.

On the front fork top member 3, there is mounted a damping device 5, the casing 6 of which is screwed on the upper surface of the front fork top member 3 by means of two screws 7. A shaft extension 8a (only visible in FIG. 2) extends downwards from the casing 6 and is rigidly connected to a radial arm 9, the free end 9a of which is secured to a bracket 4b at the upper part of the motor cycle frame. Thus, the casing 6 follows the pivoting or rotary movements of the front wheel fork 3, whereas the arm 9 and the shaft 8 are fixed to the frame. As will appear further below, a fast pivoting movement of the front wheel, in particular an oscillatory motion (s.c. wobbling), will be damped effectively. In principle, it is also possible to mount the device in such a way that the casing 6 is fixed to the frame 4, whereas the shaft 8 is non-rotably connected to the front fork top member 3. In either case, the shaft 8 should be aligned with the pivot axis A of the front wheel fork, so that all pivotal movements of this fork are directly followed by corresponding relative movements between the shaft 8 and the casing 6.

As appears best from FIG. 2, the casing 6 has an essentially triangular configuration, seen from above or in cross-section (transversally to the rotary shaft 8). The side walls 10a, 10b, 10c are slightly rounded at the corners and enclose a likewise essentially circular-sector-shaped hydraulic chamber 11, which is limited downwards by a bottom part 12 and upwards by a removable cover 13. This cover 13 is fixed to the side walls 10a, 10b, 10c by screws 14, and the necessary sealing is achieved by means of a gasket 15. As mentioned above, a shaft 8, 8a is rotatably journalled in the casing 6, namely in a cylindrical chamber 18 adjoining the sector-shaped chamber 11. The shaft 8 fits sealingly against the part-cylindrical inner surface of the chamber 18 in an angular region exceeding 180°. Thus, this surface provides an exact and stable bearing of the shaft with a large bearing surface. Hereby the wear on the bearing surfaces will be minimized, and the life of the device will be long.

The top end portion 8b of the shaft extends partly through a bore 19 in the cover 13 and is sealed off by a sealing ring 20 having annular lips facing the chamber 18 and engaging the external surface of the shaft portion 8b and the internal surface of the bore 19, respectively. Similarly, a sealing ring 21 with annular lips provides a tight axial seal between the lower end portion 8a of the shaft and a corresponding bore in the bottom part 12 of the casing 6. The end portions 8a and 8b of the shaft 8 has the same diameter, and a perfect axial balance of the shaft 8 (and a wing 23 secured thereto) is therefore achieved irrespective of the pressure in the hydraulic chamber 11.

The side of the shaft 8, which faces the side wall 10c, is fixedly joined by screw fasteners to an essentially planar wing 23, the thickness of which decreases slightly towards its free outer end, partly to secure sufficient strength, partly to extend in parallel to the side walls 10a and 10b respectively, at each end position. The wing 23 is dimensioned so as to fit sealingly to the bottom part 12, the cover 13 and the inside of the peripheral side wall 10c. By this arrangement two chamber portions 11a and 11b are defined, the respective volume depending on the angular position of the wing 23.

The chamber portions 11a, 11b are filled with a hydraulic liquid, especially a hydraulic oil of a rather high viscosity, and to enable the pivot motion of the wing 23 between the side walls 10a, 10b, bypass channels 24, 25, 26 are bored in the cover 13, so that the hydraulic liquid may flow from one chamber portion too the other during the motion of the wing.

One bypass channel 24 is provided with connection ports 24a and 24b situated adjacent to each side-wall 10b and 10a, respectively, and therefore the bypass channel 24 is effective practically during the entire pivot motion of the wing 23 between the two side walls 10b, 10a. To enable pivoting all the way to the end position close to each side wall, recesses (not shown) are made in the upper surface of the bottom part 12 quite close to the side wall. The flow capacity of the bypass channel 24 can be adjusted at will by a choke screw 27, and the position of its pointed inner end determines the effective cross-section, and consequently the flow capacity. By adjusting the position of the screw 27, the resistance of the hydraulic liquid against the pivot motion of the wing 23 and the damping effect is controlled accordingly. The choke screw 27 is connected to an easily accessible adjustment knob 29 at the upper side or outside of the cover 13, enabling the driver to adjust the damping effect when driving the motor cycle. It could, e.g., be desireable to have a lower damping effect when driving in city traffic than when driving on high-ways (where the risk of s.c. wobbling is the greatest).

FIG. 4 shows the choke screw 27 and the related choke adjustment means, including a stationary sleeve 28 and the external, rotatable adjustment knob 29, which is non-rotatably connected to the choke screw 27 by means of a cross-bar 30 (fitted into a diametrical recess of the screw 27). The sleeve 28 is screwed into a bore 31 in the casing 6 and has an internal thread cooperating with the external thread of the screw 27. The external knob 29 is axially fixed to the sleeve 28 by means of a ring member fitted into annular grooves in the sleeve 28 and the knob 29. At the top surface, the sleeve 28 is provided with a number of circumferentially distributed bores 32 cooperating with a ball 33 of larger diameter, this ball being inserted in a wider bore 34 and being spring-loaded downwards so as to snap into the respective bore 32 upon rotation of the adjustment knob 29. Hereby well-defined angular positions of the knob 29 and the choke screw 27 are obtained so as to facilitate proper setting of the same.

The bypass channel 24 also includes a velocity depending valve device including two valve balls 34, 35 each being movable between a closing position at a valve seat 36, 37 formed by the respective end of a tube portion 38 inserted into the bore forming a part of the bypass channel 24, and an opening position abutting an annular stop member 39 and 40, respectively, having circumferentially distributed recesses 41 permitting a fluid flow externally passed the ball 34 and 35, respectively. The two balls 34,35 are normally held in their opening positions by means of a pressure spring 42 extending through the tube portion 38, each end of the spring 42 acting on the respective valve ball 34, 35. It will be noted that the annular stop members 39 and 40 are constituted by the ends of tube members 43 and 44 inserted in the same bore as the tube portion 38, on each side thereof, so as to secure communication with the connecting port 24 and the passage including the choke screw 27, respectively.

It will be understood that the valve device 34,35,42 will permit a slow bypass flow in either direction, since the balls are then kept in their opening positions by the spring. When reaching a certain flow value, the flow pressure on one of the balls will displace the ball towards the seat 36 or 37 against the counteracting force of the spring 42. When the ball hits its seat, only a very small fluid flow is maintained through a narrow passage formed by a groove (not shown) in the external surface of the tube position 38. Hereby, the steering bar 1 can be turned back and forth in a conventional way practically without resistance from the damping device, whereas rapid wobbling oscillations and sudden pivotal jerks caused by irregularities on the ground will be prevented by means of the velocity depending valve device.

Figure 6:
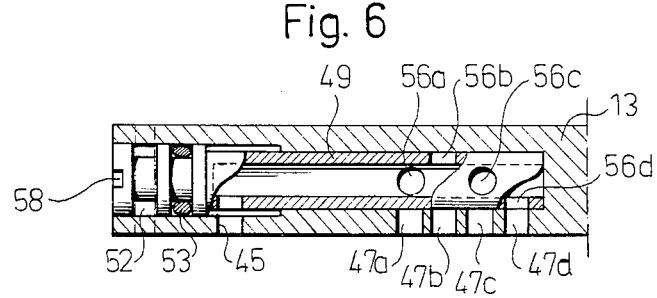
FIG. 6 shows a setting sleeve for setting the range of a central angular region in which the damping is effective.

As indicated above, the cover 13 comprises two additional bypass channels 25, 26, positioned symmetrically on each side of a longitudinal central plane, the purpose of which is to bypass the channel 24, when the wing 23 is pivoted outwardly somewhat from its central position (see FIGS. 3 and 6). These bypass channels 25,26, the flow capacities of which are substantially greater than that of the channel 24, each have an effective length which is adjustable, whereby the range of the central angular region is variable. For this purpose, there are two bores 43,44 made at each side of the cover 13, each of these bores 43,44 communicating with a connecting port 45,46 located adjacent to the side-walls 10b and 10a, respectively, i.e. near the respective end position of the wing 23, and with a row of connecting ports 47a,b,c,d and 48a,b,c,d, respectively located at each side of the central angular region. A sleeve 49 and 50, respectively, is held axially fixed in each bore 43,44 by means of a pin 51 cooperating with an annular groove 52 near the outer end of the sleeve. The sleeve 49,50 is received in each bore 43,44 and is axially sealed by means of a sealing ring 53 near its outer end. However, it is rotatable within the bore. In the region of the connecting side port 45,46, it has an opening 54,55 to provide communication between the inside of the sleeve and an annular chamber formed between the outside of the sleeve and the inside of the bore 43,44, which is slightly wider in this region than in the inner part, where the sleeve fits snugly within the bore. Here, in the region of the connecting port rows 47 a,b,c,d and 48 a,b,c,d, respectively, the sleeve is provided with openings 56 a,b,c,d and 57a,b,c,d which are offset axially and circumferentially (e.g. 90°each) so as to register with a corresponding port in the row upon rotation of the sleeve. At the outer end of the sleeve, there is a transversal slot 58 so that the sleeve can be rotated from the outside by means of a screw driver or a similar tool. It is understood that the effective length of each bypass channel 25,26 can be varied by rotating the sleeve 49 and 50, respectively. In this way, the range of the central region, where the desired damping is effected, can be adjusted by selecting one of the connecting ports 47a,b,c or d (48a,b,c or d) to communicate with the side connecting port 45 (46) via the sleeve 59 (50).

Figure 7A:
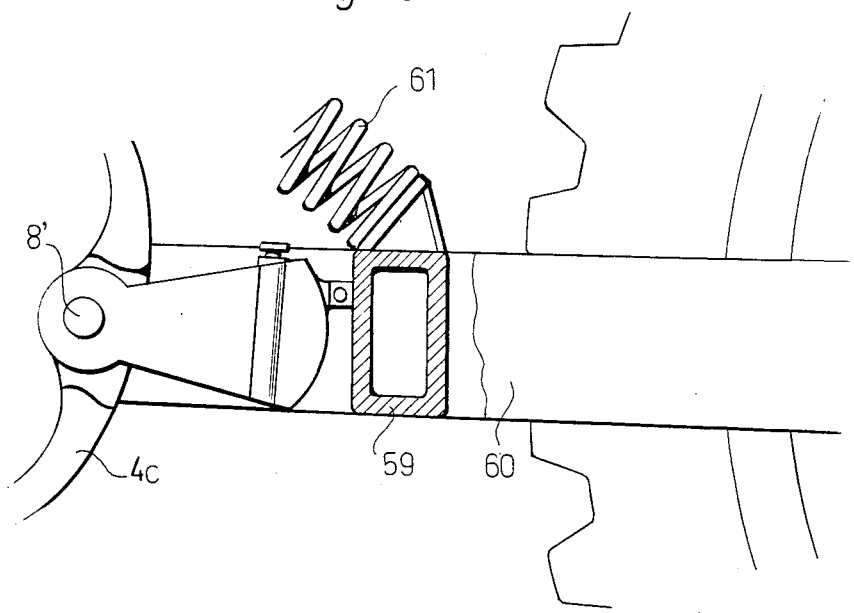
FIG. 7a and 7b show in side and perspective views a hydraulic damping device used as a shock absorber for the back wheel fork of a motor cycle.
Figure 7B:
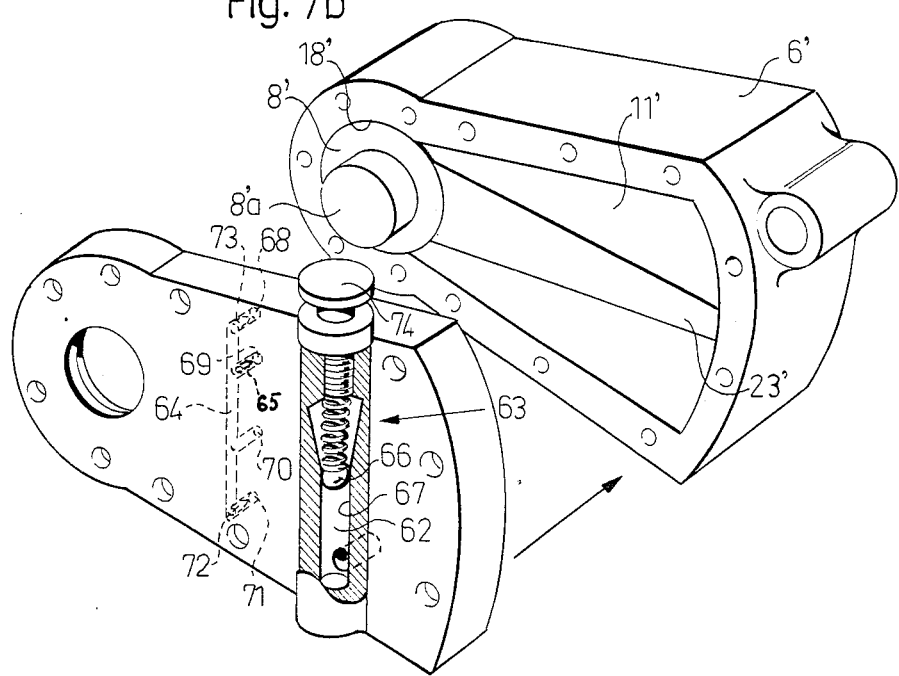

In FIGS. 7a and 7b there is shown a damping device according to the invention serving as a shock absorber for the back wheel of the motor cycle. As in the previous embodiment, the shaft 8' is securely journalled in a cylindrical chamber 18' (enclosing the shaft by more than 180°) adjoining a sector-shaped chamber 11' in which a piston wing 23', secured to the shaft 8', is pivotable back and forth (or rather up and down in the casing 6').

In this case, the shaft extensions 8'a and 8'b, which are axially sealed on each axial side of the wing 23' by means of sealing rings (not shown) are provided with splines so as to be non-rotatably connected to the motor cycle frame 4c adjacent to the motor cycle engine. On the other hand, the casing 6' is secured to a transversal member 59 of the back wheel fork 60, which is pivotally journalled around an axis being aligned with the shaft 8' (on each axial side thereof) and is resiliently held in a normal pivotal position by means of a strong spring 61. Thus, the shaft 8' and the wing 23' are rigidly connected to the frame, whereas the casing 6' follows the vertical pivotal movements of the back wheel fork 60.

Figure 5:
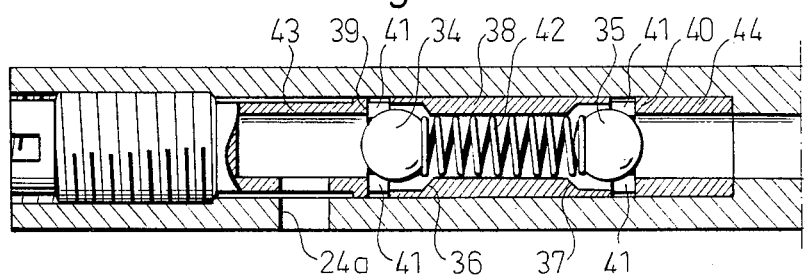
FIG. 5 shows a flow velocity depending bypass valve.

There are basicly two bypass channels in the side wall of the casing 6', namely a first channel 62 containing a check valve 63 and a second channel 64 containing either a velocity depending valve permitting only a slow bypass flow (not shown but being of the kind described with reference to FIG. 5) and/or at least one (non-illustrated) choke valve (e.g. of the kind described with reference to FIG. 4). The check valve 63 includes a spring loaded valve ball 66, which will be displaced from its normal, closing position against a corresponding valve seat 67 when the back wheel is suddenly swung upwards upon hitting a stone or the like on the ground upon landing after jumping. Then, the hydraulic fluid is permitted to flow rapidly through the first channel 62 and the open check valve 63 (while the spring 61 of the back wheel fork is being compressed). Thereupon, the spring 61 causes a rebound pivotal movement which is damped by the valve means in the second bypass channel 64. At this moment, the check valve 63 is closed, since the hydraulic fluid presses the ball 66, together with the spring, against the valve seat 67. Thus, during the rebound movement, the piston wing 23' swings upwardly relative to the casing 6' and forces the hydraulic fluid to flow through the second bypass channel 64. It will be apparent from the particular locations of the connecting ports 68,69,70,71 and the choke valves 72, 73 in the second bypass channel 64 that the first choke valve 72 will be effective during an initial part of the rebound movement and that the second choke valve 73 will be effective during a final part of the rebound movement. By adjusting the choking capacity of each valve, it is possible to achieve a desired damping characteristic of this rebound movement.

The spring of the check valve 63 can be compressed as desired by an adjustment member 74. Perferably, the ball 66 is held in closing position during all normal pivoted movements of the back wheel fork, the damping then being effected by the second bypass channel 64. Only in exceptional cases, when the back wheel is hit strongly from underneath, will the check valve 63 open so as to permit a large pivoting movement of the back wheel fork in order to avoid a direct transfer of the shock movement to the frame of the motor cycle.

I claim:

1. Hydraulic damping device for damping a relative pivotal or rotary movement of two machine or vehicle parts (3,4; 60,4c), comprising a casing (6,6') being rigidly connected to one of said parts (3;60) and having a sector-shaped hydraulic chamber (11;11'), in which a piston wing (23,23') is pivotable while being damped by hydraulic fluid, said piston wing being fastened to a rotatable shaft (8;8'), which is rigidly connected to the other of said parts (4;4c), and wherein said shaft (8;8') is journalled in a part-cylindrical chamber (18;18') radially adjoining said sector-shaped chamber (11;11'), the wall of said part-cylindrical chamber enclosing said shaft in an angular region exceeding 180°, at least one bypass channel (24) in said casing (6) with connecting ports (24a,24b) being located adjacent to two respective end positions of said piston wing (23), wherein spring-loaded valve means (34-37) are provided to control a damping effect, wherein said spring-loaded valve means (34-37) are adapted to permit a slow bypass flow of the hydraulic fluid, but to close the valve upon exceeding a predetermined flow valve, said primary bypass channel being provided with means (27) so as to effect a desired damping effect, and two secondary bypass channels (25,26) located on each side of a central angular region, and having a substantially greater flow capacity than said primary bypass channels (24), said secondary bypass channels (25,26) each including a connecting port (45,46) located adjacent to a respective end position of said piston wing (23), and at least two selectable connecting ports (47a-d, 48a-d) adjacent to said central angular region, whereby said damping effect is obtained only in said central angular region, and wherein an effective length of each of said secondary bypass channels (25,26) is adjustable, so that said central angular region has a variable range.

2. Hydraulic damping device according to claim 1, characterized in that said shaft (1;8') is sealed (20,21;) axially on each side of said part-cylindrical chamber (18,18').

3. Hydraulic damping device according to claim 2, for damping a relative pivotal movement of a motorcycle front wheel, which is rotatably journalled at the free end portion of a fork (3) having a pivot axis and being pivotably mounted at the frame (4) of the motorcycle, characterized in that the damping device is adapted to be mounted with said shaft (8) in coaxial alignment with the pivot axis (A) of said fork (3).

4. Hydraulic damping device according to claim 1, characterized in that valve means comprise two valve balls (34,35) each being movable between an opening position and a closing position against a valve seat (36,37) disposed at each end of a tube portion (38) forming a part of said by-pass channel (24), wherein spring means are arranged so as to urge each ball (34,35) towards said opening position.

5. Hydraulic damping device according to claim 4, characterized in that said spring means comprises a pressure spring (42) extending through the whole length of said tube portion (38), each end of the pressure spring acting on one of said valve balls (34,35).

6. Hydraulic damping device according to claim 4, characterized in that each ball (34,35), in said opening position, abuts a stop means (39,40) permitting said hydraulic fluid to flow externally past the ball.

7. Hydraulic damping device according to claim 1, wherein said casing (6) comprises a primary bypass channel (24) with connecting ports (24.24b) located adjacent to the end positions of said piston wing (23), said primary bypass channel being provided with choke means (27) so as to effect said damping effect, and two secondary bypass channels (25,26) located on each side of a central angular region and having a substantially greater flow capacity than said primary bypass channel (24), whereby said damping effect is obtained only in said central angular region, characterized in that the device is adapted to be mounted with said shaft (8) in alignment with the pivot axis (A) of the front wheel fork (3) of a motorcycle, and in that said spring-loaded valve means are also disposed in said primary bypass channel (24).

8. Hydraulic damping device according to claim 1, characterized in that each of said secondary bypass channels (25,26) includes a connecting port (45,46) located adjacent to an end position of said piston wing (23) and at least two selectable connecting ports (47a-d, 48a-d) adjacent to said central angular region, the range of the latter being adjustable by setting means (49,50) adapted to enable selection of one of said selectable connecting ports (47a-d, 48a-d).

9. Hydraulic damping device according to claim 8, characterized in that said setting means comprises a rotatable sleeve (49,50) having a number of radial openings (55 a-d, 57 a-d) being mutually displaced axially and circumferentially so as to register with a corresponding one of said selectable connecting ports (47 a-d, 48 a-d) upon rotation of said sleeve (49,50), said sleeve being rotatable from the outside of said casing (6).

10. Hydraulic damping device for damping a relative pivotal or rotary movement of two machine or vehicle parts (3,4; 60,4c), comprising a casing (6,6') being rigidly connected to one of said parts (3;60) and having a sector-shaped hydraulic chamber (11;11'), in which a piston wing (23,23') is pivotable while being damped by hydraulic fluid, said piston wing being fastened to a rotatable shaft (8;8'), which is rigidly connected to the other of said parts (4;4c), and wherein that shaft (8;8') is journalled in a part-cylindrical chamber (18;18') radially adjoining said sector-shaped chamber (11;11'), the wall of said part-cylindrical chamber enclosing said shaft in an angular region exceeding 180°, at least one bypass channel (24) in said casing (6) with connecting ports (24a,24b) being located adjacent to two end positions of said piston wing (23), wherein spring-loaded valve means (34-37) are provided to control a damping effect, wherein said spring-loaded valve means (34-37) are adapted to permit a slow bypass flow of the hydraulic fluid, but to close the valve upon exceeding a predetermined flow valve, said primary bypass channels being provided with choke means (27) so as to effect said damping effect, and two secondary bypass channels (25,26) located on each side of a central angular region and having a substantially greater flow capacity than said primary bypass channel (24), said secondary bypass channels including connecting ports (45,46) located adjacent to the respective end positions of said piston wing (23), whereby said damping effect is obtained only in said central angular region, and wherein the device is adapted to be mounted with said shaft (8) in alignment with the pivot axis (A) of the front wheel fork (3) of a motorcycle, said spring-loaded valve means being disposed in said primary bypass channel, said casing (6,6') including a bottom part (12) and a removable cover part (13), each having a bore (19) dimensioned to receive an end portion (8b,8a) of said shaft (8;8'), the two end portions (8b,8a) of the shaft (8;8') having the same, reduced diameter and a sealing ring (20,21) providing an axial seal on both the axial sides of said part-cylindrical chamber (18,18″) between the external surface of the respective shaft end portion (8b,8a) and the internal surface of the respective bore (19) so as to secure an axial pressure balance of said shaft (8;8′) and the attached piston wing (23,23′).

11. Hydraulic damping device for damping a relative pivotal or rotary movement of two machine or vehicle parts (3,4; 60,4c), comprising a casing (6,6′) being rigidly connected to one of said parts (3;60) and having a sector-shaped hydraulic chamber (11;11′), in which a piston wing (23,23′) is pivotable while being damped by hydraulic fluid, said piston wing being fastened to a rotatable shaft (8;8′), which is rigidly connected to the other one of said parts (4;4c), at least one bypass channel (24,25,26;62,64) for said hydraulic fluid being provided in said casing (6,6′), so that the hydraulic fluid may flow from one chamber portion (11a) to the other (11b) during pivotal motion of said piston wing (23,23′), characterized in that said shaft (8;8′) is journalled in a part-cylindrical chamber (18;18′) radially adjoining said sector-shaped chamber (11;11′), the wall of said part-cylindrical chamber providing a bearing surface for said shaft and enclosing the latter in an angular region exceeding 180°;

said casing (6,6′) comprises a bottom part (12) and a removable cover part (13), each having a bore (19) dimensioned to receive an end portion (8b,8a) of said shaft (8;8′), the two end portions (8b,8a) of the shaft (8;8′) having the same, reduced diameter and a sealing ring (20,21) providing an axial seal on both the axial sides of said part-cylindrical chamber (18,18″) between the external surface of the respective shaft end portion (8b,8a) and the internal surface of the respective bore (19) so as to secure an axial pressure balance of said shaft (8;8′) and the attached piston wing (23,23′); and said at least one bypass channel (24,25,26;62,64) in said casing is located in said removable cover part (13) and is provided with connecting ports (24a,24b,45,46;68,71) communicating with the respective chamber portions (11a,11b), said at least one bypass channel being provided with control means (27,34,35,49,50;63,72,73) in said removable cover part (13) for controlling the damping characteristic of the device.

12. Hydraulic damping device according to claim 11, characterized in that said control means (27,49,50,63) are adjustable from the outside of said removable cover (13).

13. Hydraulic damping device according to claim 11, characterized in that said control means comprises spring-loaded valve means (34,35,42) adapted to permit a slow bypass flow of the hydraulic fluid, but to close the valve upon exceeding a predetermined flow value.

14. Hydraulic damping device according to claim 13, characterized in that said valve means comprise two valve balls (34,35) each being movable between an opening position and a closing position against a valve seat (36,37) disposed at each end of a tube portion (38) forming a part of said bypass channel (24), wherein spring means (42) are arranged so as to urge each ball (34,35) towards said opening position.

15. Hydraulic damping device according to claim 13, characterized in that said at least one bypass channel comprises a primary bypass channel (24), including said spring-loaded valve means (34,35,42) and connecting ports (24a,24b) located adjacent to the end positions of said piston wing (23), and two secondary bypass channels (25,26) located on each side of a central angular region, and having a substantially greater flow capacity than said primary bypass channel (24), whereby effective damping of rapid pivotal motion is obtained only in said central angular region.

16. Hydraulic damping device according to claim 15, characterized in that the effective length of each of said secondary bypass channels (25,26) is adjustable, whereby the range of said central angular region is variable.

17. Hydraulic damping device according to claim 16, characterized in that each of said secondary bypass channels (25,26) includes a connecting port (45,46) located adjacent to a respective end position of said piston wing (23), and at least two selectable connecting ports (47a-d, 48a-d) respectively adjacent to said central angular region, the range of the latter being adjustable by setting means (49,50) adapted to enable selection of one of said selectable connecting ports (47a-d, 48a-d)

* * * * *